United States Patent
Reisinger et al.

(10) Patent No.: US 11,887,754 B2
(45) Date of Patent: Jan. 30, 2024

(54) INCREASING PRODUCTION YIELD OF COATED WIRE ELEMENTS

(71) Applicant: Heraeus Deutschland GmbH & Co. KG, Hanau (DE)

(72) Inventors: Andreas Reisinger, Hanau (DE); Jörg-Martin Gebert, Hanau (DE)

(73) Assignee: Heraeus Deutschland Gmbh & Co. KG, Hanau (DE)

( * ) Notice: Subject to any disclaimer, the term of this patent is extended or adjusted under 35 U.S.C. 154(b) by 172 days.

(21) Appl. No.: 17/214,052

(22) Filed: Mar. 26, 2021

(65) Prior Publication Data

US 2021/0304923 A1 Sep. 30, 2021

(30) Foreign Application Priority Data

Mar. 27, 2020 (EP) ..................... 20166510

(51) Int. Cl.
- *B05D 7/20* (2006.01)
- *H01B 13/06* (2006.01)
- *H01B 13/34* (2006.01)
- *B05D 5/00* (2006.01)
- *H01B 13/16* (2006.01)

(52) U.S. Cl.
CPC ............. *H01B 13/06* (2013.01); *B05D 5/005* (2013.01); *B05D 7/20* (2013.01); *H01B 13/16* (2013.01); *H01B 13/34* (2013.01); *B05D 2256/00* (2013.01)

(58) Field of Classification Search
CPC ...... B05D 5/005; B05D 7/20; B05D 2256/00; H01B 13/06; H01B 13/16; H01B 13/34
See application file for complete search history.

(56) References Cited

U.S. PATENT DOCUMENTS

2009/0171494 A1   7/2009   Wachter et al.
2017/0252867 A1   9/2017   Bach et al.

FOREIGN PATENT DOCUMENTS

| GB | 2124121 | 2/1984 |
| JP | 2014 100 323 | 6/2014 |
| JP | 2014100323 A * | 6/2014 |

OTHER PUBLICATIONS

JP-2014100323-A English translation (Year: 2014).*
English translation of JP-2014100323-A (Year: 2023).*

* cited by examiner

*Primary Examiner* — Hai Y Zhang
(74) *Attorney, Agent, or Firm* — Dicke, Billig & Czaja, PLLC (57) ABSTRACT

One aspect is a method for producing a plurality of wire elements, including providing a metal wire, coating the metal wire with a first layer to obtain a first coated wire, subjecting the first coated wire to a first quality control process, marking any first defects identified in the first quality control process, coating the first coated wire with a further layer to obtain a further coated wire, and cutting the further coated wire to obtain a plurality of wire elements. Prior to cutting the further coated wire to obtain the plurality of wire elements, a first length of the first coated wire is less than 10% longer than a further length of the further coated wire.

13 Claims, 6 Drawing Sheets

5a - III

5b - III

INCREASING PRODUCTION YIELD OF COATED WIRE ELEMENTS

CROSS-REFERENCE TO RELATED APPLICATION

This Utility patent application claims priority to European Patent Application No. 20166510.6 filed Mar. 27, 2020, which is incorporated herein by reference.

FIELD OF THE INVENTION

In general, one aspect relates to methods for coating wires. One aspect relates to a method for producing wire elements from coated wires. One aspect also relates in particular to a method for more reliably identifying and marking defects that occur during the production process of the wire elements. One aspect further relates to the wire elements that are produced by the method of the present embodiments.

BACKGROUND

Wire elements, obtainable by coating a metal wire with at least one layer, are used in a number of electrical devices. For various electrical devices, e.g., electrical motors, defects in the at least one layer are acceptable provided that the number of defects are kept below a specified number. These defects include, amongst others, scratches, pin-holes or bubbles. However, for more specialised applications, e.g., using wire elements in medical devices or as electrochemical sensor elements, it is very important to use wire elements wherein the at least one layer is defect-free. This is to ensure that e.g., the medical devices provide very accurate measurements. It is therefore necessary to identify and mark any defects in the at least one layer that occur during the production of the wire elements.

Wire elements used in medical applications often comprise three layers: an inner metal core layer, a first layer, and a further layer. The process of producing these three-layered, wire elements generally includes the steps of coating a metal wire with a first layer to obtain a first coated wire. The first coated wire has a first length. In the next step, first defects in the first layer are identified. First defects are removed by cutting the first coated wire. This cutting results in at least two first coated wire segments, wherein every first coated wire segment has a segment length that is less than the first length. First coated wire segments that have at least one first defect are discarded. The remaining, first defect-free, first coated wire segments are then coated with a further layer to obtain further coated wire segments. The further coated wire segments are then used to produce the wire elements.

The process described above is not very efficient. Firstly, the time needed to produce the wire elements increases with the number of first coated wire segments. Secondly, the cutting of the first coated wire to remove the first defects is often accompanied by a starting and stopping of production equipment, which can lead to a significant loss of production time. While the production time could possibly be partially reduced by adding additional production equipment, this has the negative effect of increasing production costs, as well as the complexity of the production process. Furthermore, removing the first defects by cutting the first coated wire leads to the loss of parts of the first coated wire that are defect free, thereby wasting potential wire elements.

For these and other reasons there is a need for the present embodiment.

SUMMARY

An object of one embodiment is to at least partially overcome at least one of the disadvantages encountered in the state of the art.

It is a further object of one embodiment to provide a method that decreases the time needed for producing a coated wire.

It is a further object of one embodiment to provide a method that decreases the number of defects that occur during the production of a coated wire.

It is a further object of one embodiment to provide a method that can reduce the dimensional variation, e.g., a diameter, of a coated wire.

It is a further object of one embodiment to provide a method that reduces the energy required for coating a wire.

It is a further object of one embodiment to provide a method that reduces the costs involved in producing a coated wire.

It is a further object of one embodiment to provide a method that reduces the complexity of the production equipment needed for coating a wire.

It is a further object of one embodiment to provide a method that reduces the time required for setting up the equipment used in coating a wire.

It is a further object of one embodiment to provide a method that can be used to identify and mark defects during the coating of a wire.

It is a further object of one embodiment to obtain defect-free coated wires.

It is a further object of one embodiment to provide a method that decreases the time needed for producing wire elements.

It is a further object of one embodiment to provide a method that decreases the number of defects that occur during the production of wire elements.

It is a further object of one embodiment to provide a method that increases the production yield of defect-free wire elements.

It is a further object of one embodiment to provide a method that can reduce the dimensional variation, e.g., a diameter, between the wire elements that are produced.

It is a further object of one embodiment to provide a method that reduces the energy required for producing wire elements.

It is a further object of one embodiment to provide a method that reduces the costs involved in producing wire elements.

It is a further object of one embodiment to provide a method that reduces the complexity of the production equipment needed for producing wire elements.

It is a further object of one embodiment to provide a method that reduces the time required for setting up the equipment used in producing wire elements.

It is a further object of one embodiment to provide a method that can be used to identify and mark defects during the production of wire elements.

It is a further object of one embodiment to obtain defect-free wire elements.

It is a further object of one embodiment to use defect-free wire elements in medical devices in order to improve the reliability of the medical devices.

It is a further object of one embodiment to obtain wire elements that have an increased life expectancy.

The embodiment is now illustrated by non-limiting examples and exemplifying embodiments and figures.

BRIEF DESCRIPTION OF THE DRAWINGS

The accompanying drawings are included to provide a further understanding of embodiments and are incorporated in and constitute a part of this specification. The drawings illustrate embodiments and non-limiting examples and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the embodiment may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present embodiment. The following detailed description, therefore, is not to be taken in a limiting sense, and the scope of the present embodiment is defined by the appended claims.

It is to be understood that the features of the various exemplary embodiments described herein may be combined with each other, unless specifically noted otherwise.

A contribution to at least partially fulfilling at least one of the above-mentioned objects is made by the independent embodiments. The dependent embodiments provide preferred embodiments which contribute to at least partially fulfilling at least one of the objects.

|1| A method for producing a plurality of wire elements, including the steps of
  a. providing a metal wire, wherein the metal wire includes an inner metal core layer;
  b. coating the metal wire with a first layer to obtain a first coated wire, wherein the first layer has a first thickness;
  c. subjecting the first coated wire to a first quality control process;
  d. marking any first defects identified in the first quality control process, in one embodiment by manipulating, in one embodiment by at least partially removing, the first layer;
  e. coating the first coated wire with a further layer to obtain a further coated wire, wherein the further layer has a further thickness;
  f. introducing two or more repeating units along the further coated wire by reducing the first thickness, the further thickness, or both;
  g. cutting the further coated wire between at least one pair, in one embodiment all pairs, of neighbouring repeating units to obtain a plurality of wire elements;
wherein
  prior to cutting the further coated wire in step g. to obtain the plurality of wire elements, a first length of the first coated wire is less than 10%, in one embodiment less than 5%, and in one embodiment less than 1%, longer than a further length of the further coated wire.

|2| The method according to embodiment |1|, wherein, before the two or more repeating units are introduced, the following steps are performed:
  a. subjecting the further coated wire to a further quality control process;
  b. identifying further defects;
  c. marking the further defects, in one embodiment by manipulating, in one embodiment by at least partially removing, either the further layer, the first layer, or both.

|3| The method according to any of the preceding embodiments, wherein, after the two or more repeating units have been introduced, the following steps are performed:
  a. subjecting the repeating units to an additional quality control process;
  b. identifying additional defects;
  c. marking the repeating units that comprise at least one additional defect with a reject mark.

|4| The method according to any of the preceding embodiments, wherein, prior to coating the metal wire with the first layer, the following steps are preformed:
  a. subjecting the metal wire to an another quality control process;
  b. identifying another defects;
  c. marking the another defects.

|5| The method according to any of the preceding embodiments, wherein laser ablation is used for at least one or all of the following:
  a. marking the first defects, the further defects, or both;
  b. reducing the first thickness, the further thickness, or both;
  c. applying the reject mark.

For embodiment |5|, all possible combination of the features a. to c. are preferred embodiments. These combinations are e.g., a; b; c; a, b; a, c; b, c; a, b, c.

|6| The method according to any of the preceding embodiments, wherein the repeating units has a length in the range of 1 mm to 110 mm, in one embodiment in the range of 2.5 mm to 80 mm, and in one embodiment in the range of 4 mm to 60 mm.

|1| The method according to any of the preceding embodiments, wherein a repeating unit includes, when moving along the length of the repeating unit, at least two sub-sections, in one embodiment at least five subsections, and further in one embodiment at least seven subsections.

|8| The method according to embodiment |7|, wherein at least one or all of the following varies between two neighbouring sub-sections:
   a. a diameter;
   b. the number of layers;
   c. the first thickness;
   d. the further thickness.

For embodiment |8|, all possible combination of the features a. to d. are preferred embodiments. These combinations are e.g., a; b; c; d; a, b; a, c; a, d; b, c; b, d; c, d; a, b, c; a, b, d; a, c, d; b, c, d; a, b, c, d.

|9| The method according to any of the preceding embodiments, wherein the first quality control process includes at least one or all of the following:
   a. inspecting the first coated wire;
   b. testing at least one physical property of the first coated wire, in one embodiment the dielectric strength;
   c. testing at least one dimensional property of the first coated wire, in one embodiment the first length, a first diameter, or both.

For embodiment |9|, all possible combination of the features a. to c. are preferred embodiments. These combinations are e.g., a; b; c; a, b; a, c; b, c; a, b, c.

|10| The method according to any of the embodiments |2| to |9|, wherein the further quality control process includes at least one or all of the following:
   a. inspecting the further coated wire;
   b. testing at least one dimensional property of the further coated wire, in one embodiment the further length, a further diameter, or both.

For embodiment |10|, all possible combination of the features a. and b. are preferred embodiments. These combinations are e.g., a; b; a, b.

|11| The method according to any of the embodiments |3| to |10|, wherein the additional quality control process includes at least one or all of the following:
   a. inspecting at least one, in one embodiment all, repeating units;
   b. testing the number of subsections in at least one, in one embodiment all, repeating units;
   c. testing at least one dimensional property of at least one, in one embodiment all, repeating units. It is preferred that the at least one dimensional property includes at least one or all of the following: at least one dimension parallel to the repeating unit, at least one dimension perpendicular to the repeating unit, or both.

For embodiment |11|, all possible combination of the features a. to c. are preferred embodiments. These combinations are e.g., a; b; c; a, b; a, c; b, c; a, b, c.

|12| The method according to any of the embodiments |4| to |11|, wherein the another quality control process includes at least one or all of the following:
   a. inspecting the metal wire;
   b. testing at least one physical property of the metal wire, in one embodiment electromagnetic properties, in one embodiment the electrical conductivity coefficient;
   c. testing at least one dimensional property of the metal wire, in one embodiment an another length, an another diameter, or both.

For embodiment |12|, all possible combination of the features a. to c. are preferred embodiments. These combinations are e.g., a; b; c; a, b; a, c; b, c; a, b, c.

|13| The method according to any of the preceding embodiments, wherein the first length of the first coated wire is in the range of 1000 m to 6000 m, in one embodiment in the range of 2000 m to 5000 m, and in one embodiment in the range of 2500 m to 4500 m.

|14| The method according to any of the preceding embodiments, wherein the time required for performing steps b. through f. in embodiment |1| is in the range of 1 m/min to 900 m/min, in one embodiment in the range of 5 m/min to 850 m/min, and in one embodiment in the range of 8.5 m/min to 600 m/min.

|15| The method according to any of the preceding embodiments, wherein at least one or all of the following is true:
   a. at least 80%, in one embodiment at least 90%, and in one embodiment at least 95% of an another length of the metal wire is coated with the first layer;
   b. at least 80%, in one embodiment at least 90%, and in one embodiment at least 95% of the first length of the first coated wire is coated with the further layer.

For embodiment 1151, all possible combination of the features a. and b. are preferred embodiments. These combinations are e.g., a; b; a, b.

|16| The method according to any of the preceding embodiments, wherein the first layer, the further layer, or both, is applied by making use of at least one of the following:
   a. wire enamelling;
   b. extrusion.

For embodiment 1161, all possible combination of the features a. and b. are preferred embodiments. These combinations are e.g., a; b; a, b.

|17| The method according to any of the embodiments |5| to |16|, wherein the laser used for the laser ablation has at least one or all of the following properties:
   a. is a solid-state laser;
   b. peak wavelength in the range of 430 nm to 780 nm, in one embodiment in the range of 470 nm to 640 nm, and in one embodiment in the range of 528 nm to 536 nm;
   c. spot size in the range of 5 µm to 50 µm, in one embodiment in the range of 8 µm to 32 µm, and in one embodiment in the range of 10 µm to 20 µm;
   d. fluence in the range of 1.0 J/cm$^2$ to 5.0 J/cm$^2$, in one embodiment in the range of 1.7 J/cm$^2$ to 4.2 J/cm$^2$, and in one embodiment in the range of 2.5 J/cm$^2$ to 3.8 J/cm$^2$.

For embodiment |17|, all possible combination of the features a. to d. are preferred embodiments. These combinations are e.g., a; b; c; d; a, b; a, c; a, d; b, c; b, d; c, d; a, b, c; a, b, d; a, c, d; b, c, d; a, b, c, d.

|18| The method according to embodiment |17|, wherein the laser is a pulsed laser with at least one or all of the following properties:
   a. a pulse duration in the range of 10 fs to 500 ns, in one embodiment in the range of 500 fs to 310 ns, and in one embodiment in the range of 13 ns to 83 ns;
   b. an energy per pulse is in the range of 2 µJ to 15 µJ, in one embodiment from 3 µJ to 12 µJ, most in one embodiment from 4 µJ to 8 µJ;
   c. the laser is pulsed at a frequency in the range of 5 kHz to 600 kHz, in one embodiment in the range of 60 kHz to 300 kHz, and in one embodiment in the range of 110 kHz to 190 kHz.

For embodiment |18|, all possible combination of the features a. to c. are preferred embodiments. These combinations are e.g., a; b; c; a, b; a, c; b, c; a, b, c.

|19| The method according to any of the preceding embodiments, wherein the first layer has at least one or all of the following properties:
   a. includes an organic material, in one embodiment a polymer, in one embodiment a material selected from the group consisting of polyurethane, polyimide, polytetrafluoroethylene, perfluoro alkoxy alkanes, ethylene tetrafluoroethylene, or a combination of two or more thereof;
   b. first thickness in the range of 10 µm to 40 µm, in one embodiment in the range of 15 µm to 35 µm, and in one embodiment in the range of 20 µm to 30 µm;
   c. an electrical conductivity in the range of $10^{-21}$ S/m to $10^{-11}$ S/m, in one embodiment in the range of $10^{-20}$ S/m to $10^{-12}$ S/m, and in one embodiment in the range of $5 \times 10^{-20}$ S/m to $2 \times 10^{-13}$ S/m.

For embodiment |19|, all possible combination of the features a. to c. are preferred embodiments. These combinations are e.g., a; b; c; a, b; a, c; b, c; a, b, c.

|20| The method according to any of the preceding embodiments, wherein the further layer has at least one or all of the following properties:
   a. includes at least one metal, in one embodiment silver, at least one a metal compound, in one embodiment silver chloride, or a combination thereof;
   b. further thickness in the range of 4 µm to 30 µm, in one embodiment in the range of 6 µm to 25 µm, and in one embodiment in the range of 8 µm to 22 µm;
   c. an electrical conductivity in the range of $10^{-8}$ S/m to $2 \times 10^{-2}$ S/m, in one embodiment in 5 the range of $10^{-7}$ S/m to $10^{-3}$ S/m, and in one embodiment in the range of $5 \times 10^{-7}$ S/m to $2 \times 10^{-4}$ S/m;

For embodiment |20|, all possible combination of the features a. to c. are preferred embodiments. These combinations are e.g., a; b; c; a, b; a, c; b, c; a, b, c.

|21| The method according to any of the preceding embodiments, wherein the metal wire has at least one or all of the following properties:
   a. includes a metal selected from the group consisting of iridium, gold, nickel, niobium, palladium, platinum, silver, titanium, tantalum, wolfram, or a combination of two or more thereof;
   b. an another diameter in the range of 40 µm to 260 µm, in one embodiment in the range of 60 µm to 210 µm, and in one embodiment in the range of 80 µm to 170 µm;
   c. an electrical conductivity in the range of $10^4$ S/m to $10^8$ S/m, in one embodiment in the range of $10^5$ S/m to $5 \times 10^7$ S/m, and in one embodiment in the range of $5 \times 10^5$ S/m to $2 \times 10^7$ S/m.

For embodiment |21|, all possible combination of the features a. to c. are preferred embodiments. These combinations are e.g., a; b; c; a, b; a, c; b, c; a, b, c.

|22| A further coated wire obtainable by a method according to any of the embodiments |1| to |21|, wherein the further coated wire includes an inner metal core layer, a first layer, and a further layer.

|23| The further coated wire according to embodiment |22|, wherein at least one or all of the following applies:
   a. the inner metal core layer includes a metal selected from the group consisting of iridium, gold, nickel, niobium, palladium, platinum, silver, titanium, tantalum, wolfram, or a combination of two or more thereof;
   b. the first layer includes an organic material, in one embodiment a polymer, in one embodiment a material selected from the group consisting of polyurethane, polyimide, polytetrafluoroethylene, perfluoro alkoxy alkanes, ethylene tetrafluoroethylene, or a combination of two or more thereof,
   c. the further layer includes at least one metal, in one embodiment silver, at least one a metal compound, in one embodiment silver chloride, or a combination thereof.

For embodiment |23|, all possible combination of the features a. to c. are preferred embodiments. These combinations are e.g., a; b; c; a, b; a, c; b, c; a, b, c.

|24| The further coated wire according to any of the embodiments 1221 to 1231, wherein at least one or all of the following applies:
   a. the inner metal core layer has a thickness in the range of 40 µm to 260 µm, in one embodiment in the range of 60 µm to 210 µm, and in one embodiment in the range of 80 µm to 170 µm;
   b. the first layer has a first thickness in the range of 10 µm to 40 µm, in one embodiment in the range of 15 µm to 35 µm, and in one embodiment in the range of 20 µm to 30 µm;
   c. the further layer has a further thickness in the range of 4 µm to 30 µm, in one embodiment in the range of 6 µm to 25 µm, and in one embodiment in the range of 8 µm to 22 µm.

For embodiment |24|, all possible combination of the features a. to c. are preferred embodiments. These combinations are e.g., a; b; c; a, b; a, c; b, c; a, b, c.

|25| The further coated wire according to any of the embodiments |22| to |24|, wherein the further coated wire includes at least two repeating units.

|26| The further coated wire according to embodiment |25|, wherein the at least two repeating units includes, when moving along the length of the repeating unit, at least two, in one embodiment at least five, and in one embodiment at least seven sub-sections, wherein a diameter of the repeating unit in one embodiment varies between two neighbouring sub-sections.

|27| A wire element obtainable by a method according to any of the embodiments |1| to |21|, wherein the wire elements in one embodiment includes an inner metal core layer, a first layer, and a further layer.

|28| The wire element according to embodiment |27|, wherein the wire element includes at least one or all of the following:
   a. the inner metal core layer includes a metal selected from the group consisting of iridium, gold, nickel, niobium, palladium, platinum, silver, titanium, tantalum, wolfram, or a combination of two or more thereof;
   b. the first layer includes an organic material, in one embodiment a polymer, in one embodiment a material selected from the group consisting of polyurethane, polyimide, polytetrafluoroethylene, perfluoro alkoxy alkanes, ethylene tetrafluoroethylene, or a combination of two or more thereof;
   c. the further layer includes at least one metal, in one embodiment silver, or at least one a metal compound, in one embodiment silver chloride, or a combination thereof.

For embodiment |28|, all possible combination of the features a. to c. are preferred embodiments. These combinations are e.g., a; b; c; a, b; a, c; b, c; a, b, c.

|29| The wire element according to any of the embodiment |27| to |28|, wherein at least one or all of the following applies:

a. the inner metal core layer has a thickness in the range of 40 μm to 260 μm, in one embodiment in the range of 60 μm to 210 μm, and in one embodiment in the range of 80 μm to 170 μm;
b. the first layer has a first thickness in the range of 10 μm to 40 μm, in one embodiment in the range of 15 μm to 35 μm, and in one embodiment in the range of 20 μm to 30 μm;
c. the further layer has a further thickness in the range of 4 μm to 30 μm, in one embodiment in the range of 6 μm to 25 μm, and in one embodiment in the range of 8 μm to 22 μm.

For embodiment |29|, all possible combination of the features a. to c. are preferred embodiments. These combinations are e.g., a; b; c; a, b; a, c; b, c; a, b, c.

|30| The wire element according to any of the embodiments |27| to |29|, wherein the wire element includes, when moving along the length of the wire element, at least two, in one embodiment at least five, and in one embodiment at least seven sub-sections, wherein a diameter of the wire element in one embodiment varies between two neighbouring subsections.

|31|A use of a wire element according to any of the embodiments |27| to |30| in an electrical device, in one embodiment a medical device, in one embodiment a medical device used for measuring, and further in one embodiment a medical device used for measuring blood glucose levels.

|32|A use of a wire element according to any of the embodiments 1271 to 1301 as a sensor, in one embodiment an electrochemical sensor, in one embodiment an electrochemical sensor for a medical device used for measuring, and further in one embodiment an electrochemical sensor for a medical device used for measuring blood glucose levels.

DETAILED DESCRIPTION OF THE EMBODIMENT

The present embodiments relate to a method for producing a plurality of wire elements. A "wire element" is defined as a longitudinal section that has been cut off from a wire. In one embodiment it is preferred that the wire is a coated wire. A "coated wire" is defined as a metal wire that is coated with at least one layer.

In the context of the present embodiments, examples of a "wire" include a metal wire, a first coated wire, and a further coated wire. Examples of a "coated wire" include a first coated wire and a further coated wire. Examples of a "layer" include a first layer, a further layer, and an additional layer. Examples of a "thickness" include a first thickness or a further thickness. Examples of "defects" include first defects, further defects, additional defects, and another defects. Examples of a "quality control process" include a first quality control process, a further quality control process, an additional quality control process, and an another quality control process. Examples of a "sub-section length" include a first sub-section length and a further sub-section length. Examples of a "diameter" include a first diameter, a further diameter, an even further diameter, a diameter of a repeating unit, and a diameter of a subsection.

In the present embodiments, if a cross-sectional cut is made of a wire or a repeating unit, then the cross-sectional cut will comprise at least one layer, e.g., the inner metal core layer, the first layer, the further layer. A "diameter" is defined as a total diameter of the cross-sectional cut, e.g. a total diameter of all the layers in the cross-sectional cut. A "thickness" of a layer is defined as a thickness of an individual layer. If the cross-sectional cut has only one layer, then the diameter will be equivalent to the thickness. If the cross-sectional cut has more than one layer, then the thickness of a layer will be less than the diameter.

In a first aspect of one embodiment, a metal wire including an inner metal core layer is provided. In this aspect it is preferred that the inner metal core layer includes a metal or a metal alloy. It is particularly that the inner metal core layer includes tantalum. It is also preferred that the metal wire further includes an outer metal core layer. It is more preferred that the outer metal core layer surrounds the inner metal core layer. It is further preferred that the outer metal core layer includes a metal or metal alloy. It is preferred in one embodiment that the outer metal core layer includes platinum. It is preferred in one embodiment that the inner metal core layer, the outer metal core layer, or both, are electrically conducting.

In another aspect of one embodiment, the metal wire is coated with a first layer to obtain a first coated wire. In this aspect it is preferred that the first layer is an electrical insulator. In yet another aspect of one embodiment, the first coated wire is coated with a further layer to obtain a further coated wire. In this aspect, it is preferred that the further layer is electrically conducting.

In an aspect of one embodiment, the first coated wire has a first length. It is preferred that the first length is a total length of the first coated wire, as measured between two endpoints of the first coated wire. In another aspect of one embodiment, the further coated wire has a further length. It is preferred that the further length is a total length of the further coated wire, as measured between two endpoints of the further coated wire. In another aspect of one embodiment, the metal wire has an another length. It is preferred that the another length is a total length of the metal wire, as measured between two endpoints of the metal wire.

Coating Wires

The coating of a metal wire or a coated wire is a well-known and established process in industry. The equipment for this process is commercially available from a number of companies e.g., Aumann AG (Germany) and Sicme Italie Impianti S.r.l (Italy). The coating can be obtained commercially from e.g., Axalta Coating Systems GmbH (Germany) and Elantas GmbH (Germany).

Quality Control Processes

In the context of one embodiment, "first defects" are defects identified in the first coated wire. E.g., scratches, bubbles, or pin-holes in the first layer. E.g., a first diameter or the first length of the first coated wire falls outside of a first product specification range. "Further defects" are defects identified in the further coated wire. E.g., scratches, bubbles, or pin-holes in the further layer. E.g., a further diameter or the further length of the further coated wire falls outside of a further product specification range.

In the context of one embodiment, "additional defects" are defects identified in a repeating unit. E.g., a repeating unit wherein the first thickness of the first layer, the further thickness of the further layer, or both, has been insufficiently reduced. E.g., a repeating unit wherein a length of the repeating unit falls outside a product specification range. E.g., a repeating unit wherein a diameter of the repeating unit falls outside a product specification range. E.g., scratches, bubbles, or pin-holes in the first layer, the further layer, or both.

In the context of one embodiment, "another defects" are defects identified in the metal wire. E.g., scratches on the metal wire. E.g., an another diameter or an another length of the metal wire that falls outside of an another product specification range.

In various embodiments, a quality control process including the step of inspecting a wire is preferred. E.g., a further quality control process that includes the step of inspecting the further coated wire. The "inspecting" of the wire should be understood to mean the identification of visible defects. E.g., visible defects include bubbles and scratches.

The definition of "inspecting" applies, mutatis mutandis, to the repeating units. E.g., inspecting the repeating units for scratches in the metal wire, the first layer, the further layer, or all of the above. E.g., inspecting the repeating units for bubbles in the first layer, the further layer, or both.

In one embodiment, the additional quality control process includes the steps of testing at least one dimensional property of at least one, in one embodiment all, repeating units. In this aspect it is preferred to test the length of the repeating unit, the diameter of the repeating unit, or both, of at least one, in one embodiment all, repeating units. It is also preferred to test the first thickness, the further thickness, or both, of at least one, in one embodiment all, repeating units. If the repeating unit includes sub-sections, it is further preferred to test a sub-section length, a diameter of the sub-section, or both, of at least one, in one embodiment all, of the sub-sections. It is also preferred to test the first thickness, the further thickness, or both, of at least one, in one embodiment all, of the sub-sections.

In a further embodiment, the another quality control process includes the steps of testing at least one physical property of the metal wire. In this aspect it is preferred to test the at least one physical property by applying an electrical current to the metal wire. In this aspect it is further preferred to test the at least one physical property by measuring eddy currents in the metal wire.

Inspection Means

It is preferred in one embodiment to use at least one inspection means that is adapted and arranged for inspecting a wire, at least one repeating unit, or both. E.g., using an inspection means for inspecting the first coated wire for scratches. It is also preferred to use at least one inspection means that is adapted and arranged for testing at least one dimensional property of a wire, at least one repeating unit, or both. E.g., using an inspection means to test the another diameter of the metal wire.

In this aspect, it is preferred that the at least one inspection means includes a laser. In this aspect it is more preferred that the at least one inspection means includes a camera. It is also preferred that the at least one inspection means includes a computer. It is preferred in one embodiment that the computer includes image recognition software. Such inspection means are well-known to a person skilled in the art, and are commercially available from, e.g., MAG Machines GmbH (Austria).

Marking Defects

In various aspects of one embodiment, defects in a layer are marked by manipulating at least one layer. The term "manipulate" should be understood to mean that at least one measurable property of at least one layer of a coated wire is either increased or decreased. The at least one measurable property can be at least one physical property, at least one dimensional property, or both. Examples of physical properties include the dielectric strength or the roughness of the at least one layer. Examples of dimensional properties include a thickness of the at least one layer.

In this aspect, it is preferred to manipulate a longitudinal portion of the coated wire. In this aspect, it is further preferred that a length of the longitudinal portion is less than or equal to a length of a wire element. In this aspect, it is even further preferred that the position of any defects identified at least partially coincides with the position of the longitudinal portion.

In this aspect it is preferred to manipulate the at least one layer by reducing the thickness of the at least one layer. It is, however, more preferred to manipulate the at least one layer by removing the at least one layer.

In this aspect it is also preferred that the at least one layer is manipulated around a circumference of the coated wire. In this aspect it is further preferred that the at least one layer is manipulated around a partial circumference of the coated wire. E.g., when a cross-section is made of the coated wire prior to manipulation, the shape of the at least one layer, to a first approximation, is in the shape of an "O". After manipulation around the partial circumference, the at least one layer is, to a first approximation, in the shape of a "C".

The at least one layer can be manipulated by, e.g., using laser ablation to remove the at least one layer, using a blade to reduce the thickness of the at least one layer, using physical abrasion to increase a roughness of the at least one layer, or applying compressive force to a coated wire so that a cross-sectional shape of the at least one layer is deformed. It is preferred in one embodiment to use laser ablation to manipulate the at least one layer.

In the aspect of marking defects, it is also preferred to mark another defects in the metal wire by selectively coating the metal wire with the first layer. It is also preferred to mark first defects in the first coated wire by selectively coating the first coated wire with the further layer. The term "selectively coating" should be understood to mean that a longitudinal section of a wire is not coated with a layer. E.g., if the metal wire has a scratch at a certain position, then a longitudinal portion of the metal wire is not coated with the first layer.

It is preferred in one embodiment that when a defect is marked, that the marking is detectable or measurable by the inspection means. It is also particularly preferred that marking a wire leads to the wire failing at least one quality control process. It is preferred in one embodiment that the first coated wire is not cut when first defects are identified. It is most preferred that the first coated wire is not cut in order to remove first defects.

Repeating Units

In an aspect of one embodiment, two or more repeating units are introduced along the further coated wire by reducing the thickness of at least one layer. "Repeating units" are introduced as follows: at least two longitudinal sections of the further coated wire are defined. Next, the thickness of the at least one layer is reduced in the same pattern for the at least two longitudinal sections. A longitudinal section wherein at least one layer has been reduced according to a repeating pattern is defined as a "repeating unit". E.g., repeating units are introduced by defining five longitudinal sections in the further coated wire. Next, the further thickness in a first half of every longitudinal section is reduced.

Note that while it is preferred that repeating units have the same length, this is not a requirement. It is also preferred that the length of the repeating unit is equal to the length of a wire element. Note that it is also not a requirement that all repeating units introduced in the further coated wire should have the same pattern. It is also preferred that the further wire includes repeating units with at least two different repeating patterns.

The thickness of the at least one layer is defined as being "reduced" if the thickness is reduced at any position along the further length or a further circumference of the further coated wire. It is preferred in one embodiment to reduce the thickness of the at least one layer by removing the at least one layer.

It is preferred to reduce the thickness of the at least one layer by applying a compressive force to the further coated wire. It is, however, more preferred to use laser ablation to reduce the thickness of the at least one layer. It is further preferred to introduce the repeating units along at least 80%, in one embodiment at least 90%, and further in one embodiment at least 95% of the further length of the further coated wire.

Repeating Unit Patterns

In one embodiment, a repeating unit includes at least two sub-sections. In this aspect it is preferred that the repeating unit includes a first subsection, wherein a first sub-section length of the first sub-section is at least 70%, in one embodiment at least 75%, and further in one embodiment at least 80% of a total length of a repeating unit. In this aspect it is additionally preferred that the first sub-section length is less than 90%, in one embodiment less than 93%, and further in one embodiment less than 95% of the total length of the repeating unit. It is preferred in one embodiment that the first sub-section includes the first layer, the further layer, or both.

In this aspect it is also preferred that the repeating unit includes a further sub-section. In one embodiment that the further sub-section does not comprise either the first layer or the further layer. It is preferred that a further sub-section length of the further sub-section is less than 10%, in one embodiment less than 7%, and further in one embodiment less than 5% of the total length of the repeating unit.

Reject Mark

In another embodiment, repeating units that comprise at least one additional defect are marked with a reject mark. It is preferred that the reject mark is applied by not manipulating the first layer or the further layer of a repeating unit, e.g., the reject mark is a reject stamp. It is, however, more preferred that the reject mark is applied by manipulating either the first layer, the further layer, or both, of a repeating unit.

In this aspect it is preferred that the reject mark is measurable or detectable by the at least one inspection means. It is further preferred that the presence of the reject mark on a repeating unit leads to the repeating unit failing at least one quality control process.

Laser Ablation

Laser ablation is another well-known and established process in industry, and is described in e.g., *Lehrbuch Mikrosystemtechnik: Anwendungen, Grundlagen, Materialien und Herstellung von Mikrosystemen*, Dehne, Adler and Schwesinger (2008). In the context of one embodiment, it is preferred that a single laser is used to perform the laser ablation. It is, however, more preferred that at least two lasers are used to perform the laser ablation. In this aspect, it is preferred in one embodiment that the at least two lasers have different properties. It is preferred in one embodiment that a first laser is used to manipulate or reduce the first layer. It is also particularly preferred that a further laser is used to manipulate or reduce the further layer.

Wire Elements

In one aspect of one embodiment, the further coated wire is cut between at least one pair of neighbouring repeating units to obtain at least two wire elements. It is preferred that every wire element includes multiple repeating units. It is, however, more preferred that every wire element consists of a single repeating unit. If a wire element consists of a single repeating unit, it is preferred in one embodiment that the length of the wire element is equal to the length of the repeating unit.

Figure 1:
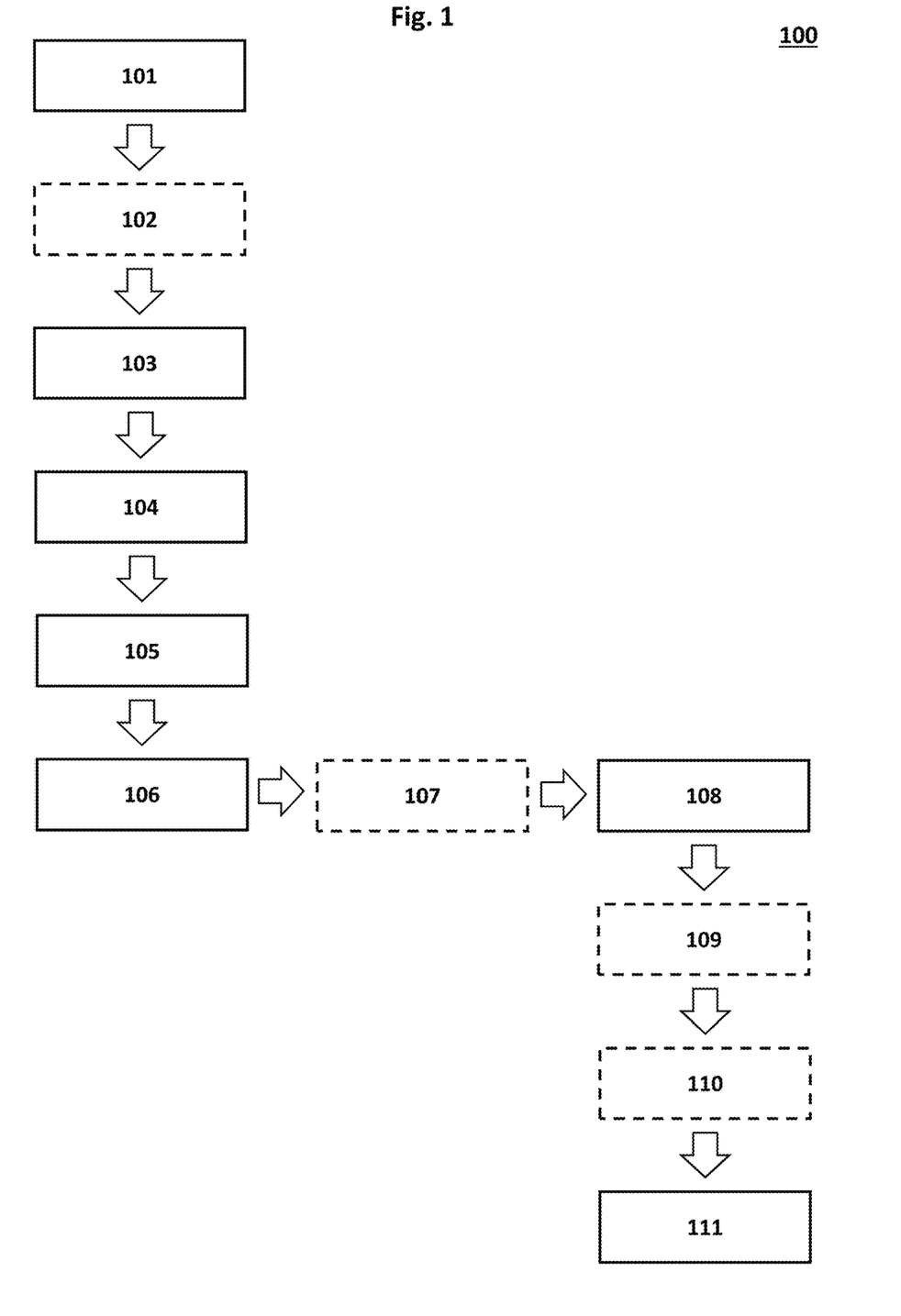
FIG. 1: flow diagram illustrating the method steps for producing wire elements.

FIG. 1 illustrates the method steps for producing a plurality of wire elements according to the present embodiments. In step 101 a metal wire is provided. In an optional step 102, the metal wire is subjected to an another quality control process. In step 103, the metal wire is coated with a first layer to obtain a first coated wire, wherein the first layer has a first thickness. In step 104, the first coated wire is subjected to a first quality control process. Any defects that are identified in the first coated wire are marked in step 105.

The first coated wire is then coated in step 106 with a further layer to obtain a further coated wire. The further layer has a further thickness. In the optional step 107, the further coated wire is subjected to a further quality control process. In step 108, two or more repeating units are introduced along the further coated wire by reducing either the first thickness, the further thickness, or both.

In optional step 109, at least one repeating unit is subjected to an additional quality control process. In optional step 110, repeating units with any additional defects identified are marked with a reject mark. The further coated wire is cut between at least one pair of neighbouring repeating units in step 111, thereby obtaining a plurality of wire elements.

Figure 2:
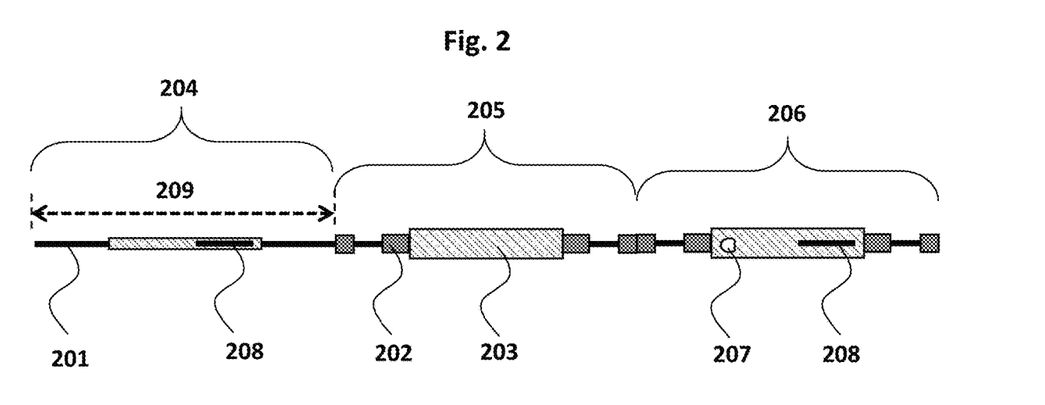
FIG. 2: schematic illustration of a further coated wire with repeating units.

FIG. 2 illustrates a further coated wire 200 that consists of a metal wire 201, a first layer 202, and a further layer 203. FIG. 2 further illustrates that the first layer 202 and the further layer 203 were removed in a repeating pattern, leading to the introduction of repeating units 204, 205, and 206. The layers 202 and 203 were removed using laser ablation. The repeating pattern is visible in repeating units 205 and 206, but not in repeating unit 204.

Repeating unit 204 has only the metal wire 201 and the further layer 203. During the production of the further coated wire 200, a first defect was detected in the first layer 202 (see step 104 of FIG. 1) of a first coated wire. The first defect was marked (see step 105 of FIG. 1) by removing a longitudinal portion 209 of the first layer 202 from repeating unit 204. After removal of the first layer 202 in longitudinal portion 209, the first coated wire was coated with the further layer 203. Repeating units 204, 205, and 206 were then introduced to obtain the further coated wire 200.

Note that the process of removing the first layer 202 and the further layer 203 in a repeating pattern was also applied to repeating unit 204. However, the fact that the first layer 202 was removed leads to the repeating pattern not being visible in repeating unit 204.

FIG. 2 illustrates that the length of the longitudinal portion 209 is equal to the length of repeating unit 204. Although this is preferred, this is not a requirement. The length of the longitudinal portion 209 can also be smaller or larger than the length of repeating unit 204. FIG. 2 also illustrates that the position of the longitudinal portion 209 coincides with the position of repeating unit 204. Although this is preferred, this is also not a requirement. It is also possible that the position of a longitudinal portion only partially coincides with the position of a repeating unit. In this case, the longitudinal portion will partially extend over two, neighbouring repeating units. E.g., the longitudinal portion 209 could have partially extended over repeating units 204 and 205.

FIG. 2 also illustrates that repeating unit 206 has a further defect 207 in the further layer 203. The repeating units 204, 205, and 206, were tested in an additional quality control process. Due to the presence of the further defect 207, repeating unit 206 has been marked with a reject mark 208.

Due to the lack of the first layer 202, repeating unit 204 did not pass the additional quality control process, and is therefore also marked with the reject mark 208.

FIG. 2 illustrates that the reject mark 208 is applied by using layer ablation to remove the first layer 202 and the further layer 203 along a longitudinal portion. As a result, the metal wire 201 becomes visible in the reject mark 208. The first layer 202 and the further layer 203 was also not completely removed around the circumference of the further coated wire 200. Rather the reject mark 208 has the form of a slit in the further coated wire 200. Furthermore, the reject mark 208 is detectable by an inspection means that includes a camera and a computer with image recognition software.

Figures 3A, 3B:
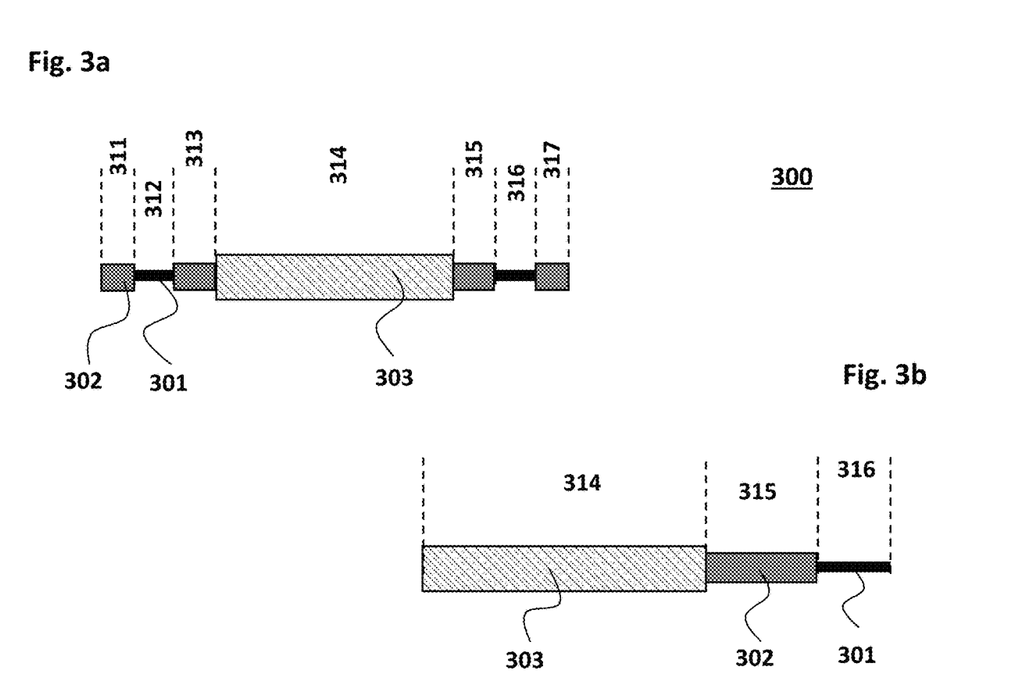
FIG. 3a-3b: schematic illustration showing repeating unit patterns.

FIGS. 3a-3b show two exemplifying repeating units 300 with two different repeating patterns. FIG. 3a illustrates a repeating unit 300 with seven sub-sections, 311 to 317. Every sub-section has a different number of layers compared to neighbouring sub-sections. FIG. 3b illustrates a repeating unit 300 with three sub-sections, 314 to 316. Every sub-section again has a different number of layers compared to neighbouring sub-sections.

In FIGS. 3a-3b, sub-sections 311, 313, 315, and 317 consist of a metal wire 301 surrounded by a first layer 302. Sub-section 314 consists of the metal wire 301 surrounded by the first layer 302, which in turn is surrounded by a further layer 303. Sub-sections 312 and 316 consist of only the metal wire 312.

Note that a further coated wire will comprise at least two repeating units with the same repeating pattern. However, it is not necessary that all repeating units in a further coated wire have the same pattern. An example according to one embodiment is a further coated wire that has two repeating units according to FIG. 3a, as well as two repeating units according to FIG. 3b. Further note that FIGS. 3a-3b also serve as examples of wire elements, wherein the wire elements have the same length as the repeating units.

Figures 4A, 4B:
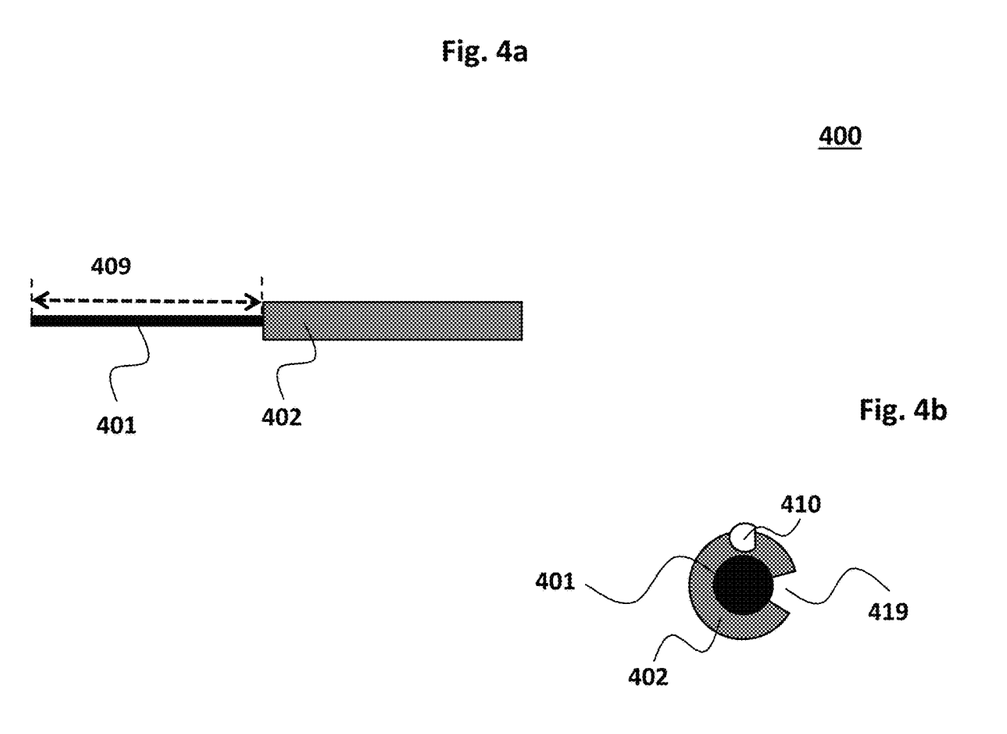
FIG. 4a-4b: schematic illustration of a first coated wire.

FIGS. 4a-4b are a schematic illustration of a first coated wire 400. FIG. 4a illustrates the first coated wire 400 along its length. The first coated wire consists of a metal wire 401 and a first layer 402. A first defect was detected in the first layer 402. The first defect was marked by removing the first layer 402 in a longitudinal portion 409. The first defect was located in the longitudinal portion 409.

FIG. 4b illustrates an alternative of marking the first defect. FIG. 4b illustrates a cross-section of the first coated wire 400. The cross-section is made perpendicular to the length of the first coated wire 400. The first layer 402 has a first defect 410. Similar to FIG. 4a, the first layer 402 was removed in the longitudinal portion. However, in contrast to FIG. 4a, FIG. 4b illustrates that the first layer 402 was not removed around a circumference of the first coated wire 400. Instead, the first layer 402 was only partially removed, leading to the cut-out 419. As a result, the first layer 402 is, to a first approximation, in the shape of a "C".

Figure 5A:
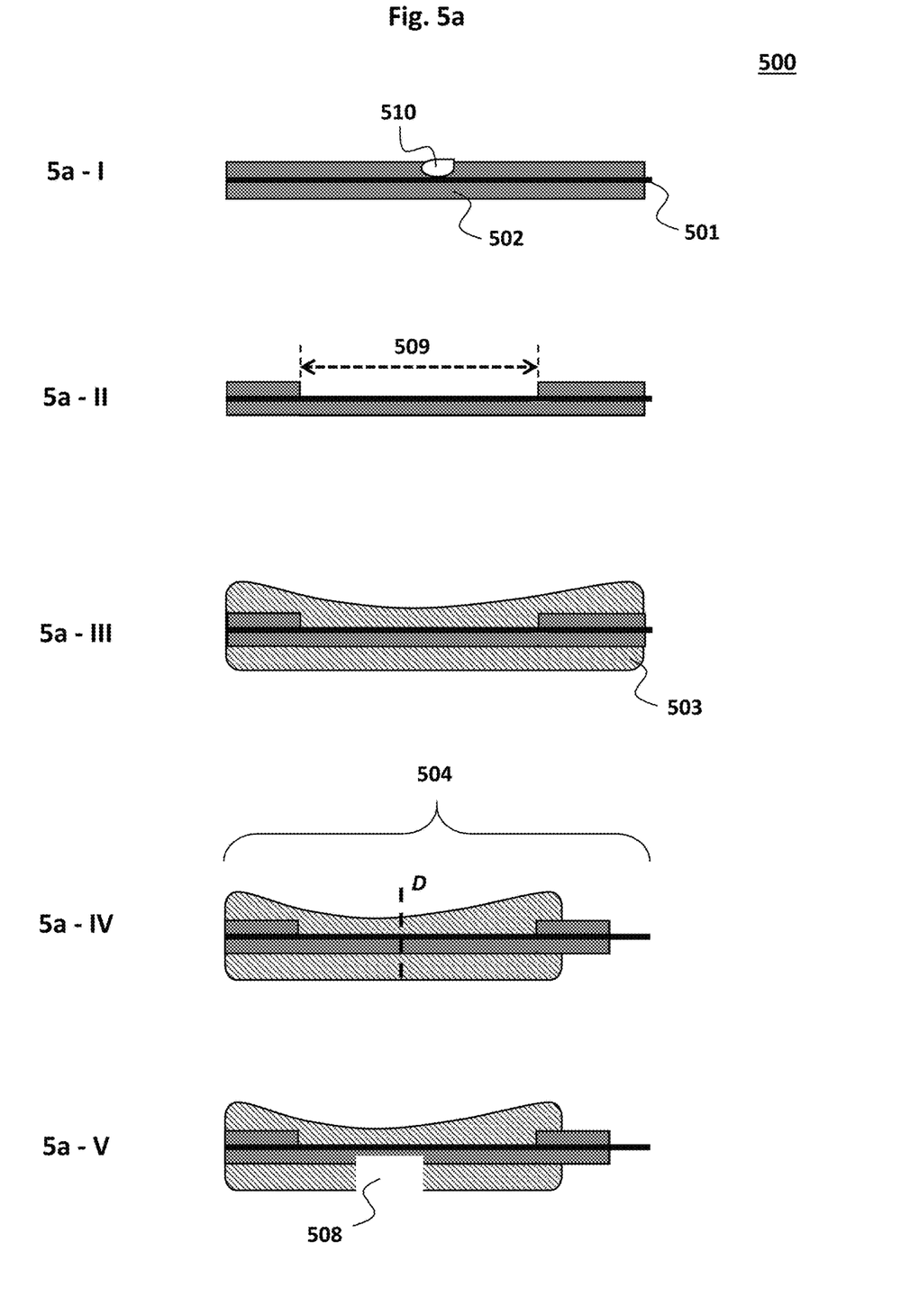
FIG. 5a-5b: schematic illustration of marking effects in a first coated wire.

FIG. 5a illustrates the process 500 for marking a first defect. Shown is a section of a first coated wire, where a cross-section has been made along a length of the section. FIG. 5a-I illustrates that the first coated wire consists of a metal wire 501 that is surrounded by a first layer 502. The first layer 502 has a defect 510 that has been identified in a first quality control process.

FIG. 5a-II illustrates that the first layer 502 has been removed along a longitudinal portion 509. It can also be seen that the position of the first defect 510 coincided with the position of the longitudinal portion 509. It can further be seen that the longitudinal portion 509 was not removed around the circumference of the first coated wire (see FIG. 4b).

FIG. 5a-III illustrates that the first coated wire is coated with a further layer 503 to obtain a further coated wire. Due to the removal of the first layer 502 in the longitudinal portion 509, the further layer 503 does not have a uniform further thickness along a length of the further coated wire. Consequently, a further diameter is also not uniform the length of the further coated wire.

FIG. 5a-IV illustrates that a repeating unit 504 has been introduced along the further coated wire. In this example, the repeating unit has the pattern illustrated in FIG. 3b. The repeating unit 504 was subjected to an additional quality control process. A diameter of the repeating unit at a position D did not meet the product specifications. As a result, the repeating unit 504 is marked with a reject mark 508, as shown in FIG. 5a-V. The reject mark 508 is applied by removing the further layer 503 and the first layer 502 using laser ablation.

Figure 5B:
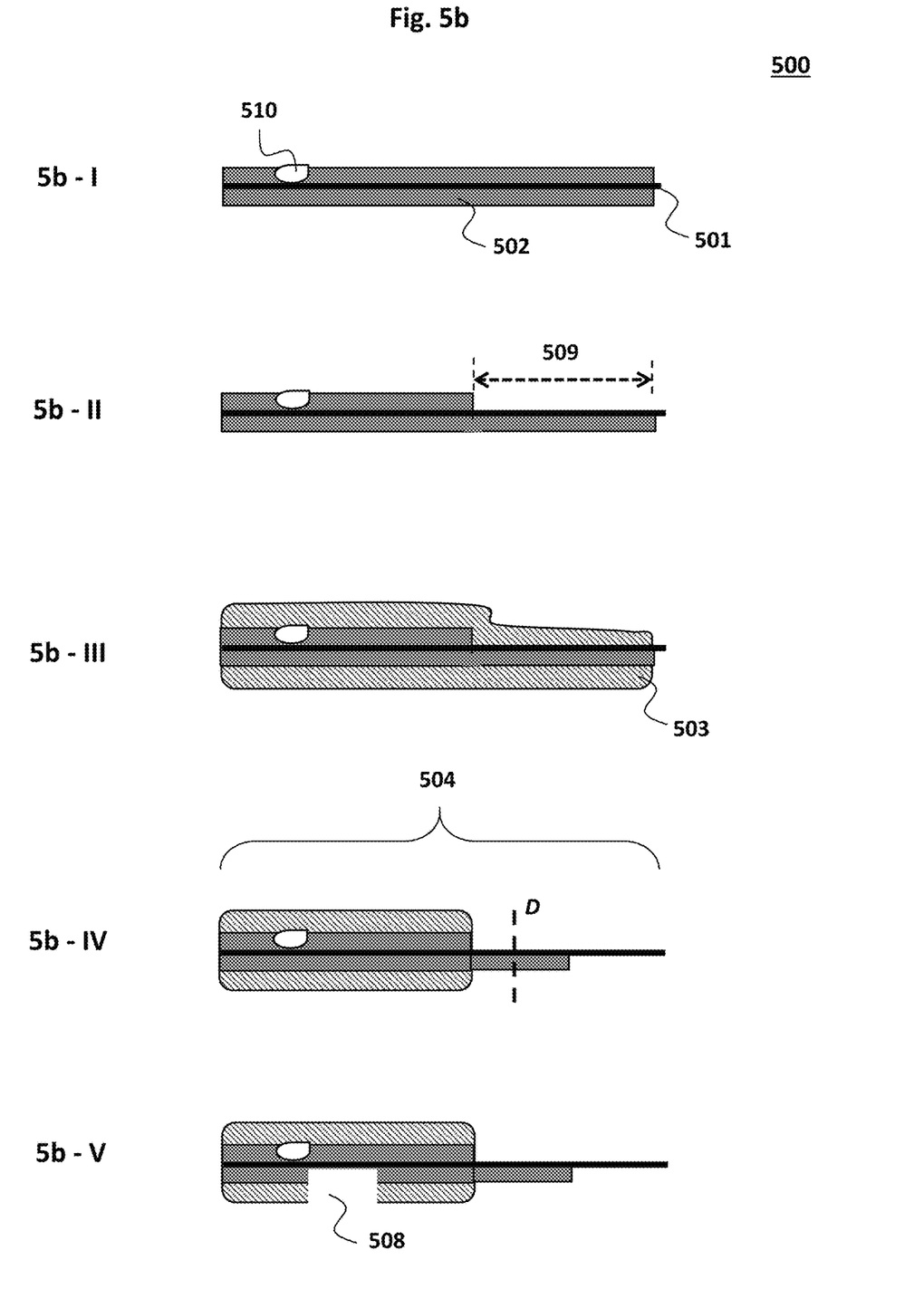

FIG. 5b illustrates a further process 500 for marking a first defect. The process is similar to that of FIG. 5a, with the difference that the first defect 510 is marked by removing the first layer 502 along a longitudinal portion 509, wherein the position of the longitudinal portion 509 does not coincide with the position of the first defect 510. This is illustrated in FIG. 5b-II. Nevertheless, when the repeating unit 504 is subjected to the additional quality control process, a diameter of the repeating unit 504 at the position D did not meet the product specifications. This is shown in FIG. 5b-IV. As a result, the repeating unit 504 is marked with a reject mark 508, as shown in FIG. 5b-V. The reject mark 508 is applied by removing the further layer 503 and the first layer 502 using laser ablation.

Figure 6:
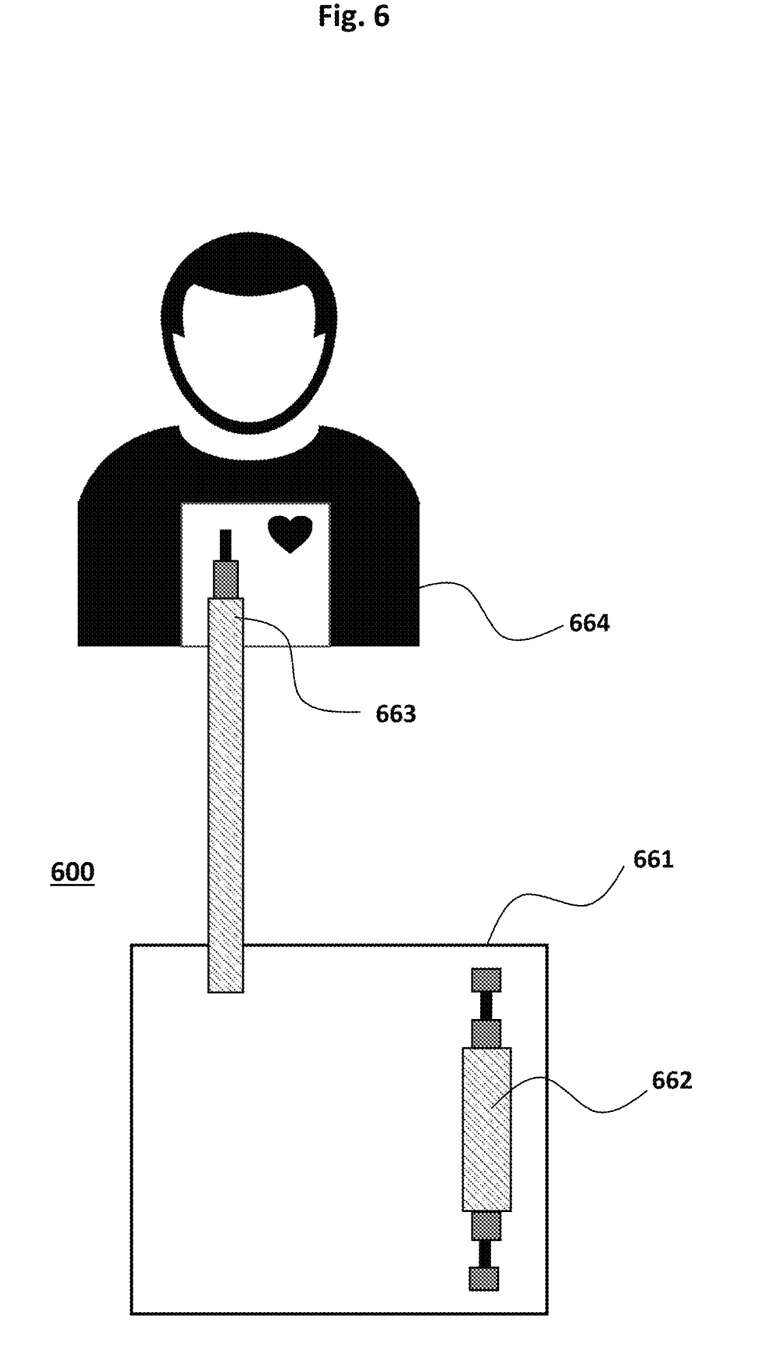
FIG. 6: use of wire elements in a medical device.

FIG. 6 illustrates the use of wire elements in a medical device 600. The medical device has a main body 661. A first wire element 662 is used in the circuits of the main body 661. A further wire element 663 is used as the electrode of the medical device 600. The medical device 600 is used to measure the blood glucose levels of a patient 664.

Test Methods

Unless otherwise stated, all test methods are performed at a temperature of 25° C. and a pressure of 101 325 Pa.

Electrical Conductivity

Electrical conductivity is measured according to the standard ASTM B193-16.

Dielectric Strength

The dielectric strength of a coated wire is measured according to the standard DIN EN 60851-5:2009-05. Equipment used in the testing procedure can be commercially obtained from DSE Test Solutions A/S (Denmark).

Wire Diameter

A diameter of a wire is measured according to the standard IEC 60851-2:2009.

Number of Defects

The number of defects in a first coated wire is measured according to the standard DIN EN 60851-5:2009-05. The number of defects in the further coated wire and the wire elements is measured using an inspection means.

Measurement Reliability

Continuous glucose monitors (CGM) that comprise wire elements are used to measure a standard sample. 100 CGM are used, in turn, to measure the glucose levels of a standard sample. Every CGM is used to make 200 measurements. The variance of the measurements is an indication of the measurement consistency. The smaller the variance, the more reliable a CGM is.

Life Expectancy

The following measurement is repeated using 100 different wire elements, wherein every wire element includes a metal wire, a first layer, and a further layer. The wire elements are used as a sensor element of a continuous glucose monitors (CGM). Before using the wire element to measure blood glucose levels, the dielectric strength of the wire element is measured. The blood glucose levels of a blood sample is then continuously measured for 24 hours. The dielectric strength of the wire element is then again measured. The difference in the dielectric strength prior to, and after measuring the blood glucose levels, is an indication of the life expectancy of a wire element. The smaller the aforementioned difference, the longer the life expectancy.

Layer Thickness Variation

Cross-sectional cuts are made through a wire element that consists of multiple subsections. A cross-section cut is made through every sub-section. The thickness of a layer in a cross-sectional cut is measured. The measurement is repeated for 1000 wire elements. A smaller variation in the thickness of a layer is preferred. The layer thickness variation for the further coated wire is measured using an inspection means.

Diameter Variation

The variation in the diameter of the first coated wire, the further coated wire, and the wire elements are measured using an inspection means. The diameter is measured for every sub-section of a wire element.

EXAMPLES

The embodiments are now illustrated by non-limiting examples.

Example 1

A metal wire with a diameter of 100 µm is provided. The metal wire includes tantalum and platinum. The metal wire has an another length of 4000 m. The metal wire is coated with a first layer to obtain a first coated wire with a first length of 4000 m. The first layer consists of polyurethane, and has a first thickness of 25 µm.

The first coated wire is subjected to a first quality control process in order to identify first defects. The first quality control process tests the dielectric strength of the first layer, as well as a first diameter of the first coated wire. The first quality control process also includes inspecting the first coated wire in order to identify bubbles or scratches in the first layer.

When any first defects are identified in the first coated wire, the first layer is removed in a longitudinal portion using laser ablation. Every first defect is located in a longitudinal portion. The length of the longitudinal portions is 25 mm.

The first coated wire is then coated with a further layer to obtain a further coated wire. A further length of the further coated wire is 4000 m. The further layer includes polyurethane, silver, and silver chloride, and has a further thickness of 15 µm.

In the next step, the first layer and the further layer are removed in a repeating pattern, thereby introducing repeating units. The first layer and the further layer are removed using laser ablation. All repeating units have the same pattern, with the average length of a repeating unit being 25 mm. Every repeating unit consists of three subsections. The first subsection consists of the metal wire, the first layer, and the further layer. The second subsection consists of the metal wire and the first layer. The third subsection consists of the metal wire.

The further coated wire is cut between every pair of neighbouring repeating units. A plurality of wire elements with an average length of 25 mm is thereby obtained.

Example 2

This example is a comparison of two methods for producing a plurality of wire elements. The first method is according to one embodiment, as described in Example 1. The second method is according to the prior art, as described in the "Background" section.

A difference between the present embodiments and the prior art is that the latter teaches that the first coated wire should be cut when first defects are identified. This is in contrast to the present embodiments, wherein the first coated wire is not cut.

Table 1 is a comparison of the two methods. For the comparison, the following average quantities were measured:
- production time: the time needed to produce 1000 m of the further coated wire or 1000 wire elements;
- number of defects: the number of defects in the first coated wire, the further coated wire, or the wire elements;
- production yield: the number of defect-free wire elements produced from a metal wire with a length of 1000 m;
- layer thickness variation: the variation in the thickness of a layer in the further coated wire or the wire elements.
- diameter variation: the variation in the diameter of the first coated wire, the further coated wire, or the wire elements.
- energy consumption: the energy needed in producing 1000 m of the further coated wire or 1000 wire elements;
- costs: the cost of producing 1000 m of the further coated wire or 1000 wire elements;
- set-up time: the time needed for setting up the production equipment used for producing the further coated wire and the wire elements;
- measurement reliability: the reliability of a measuring device using the wire elements;
- life expectancy: the life expectancy of the wire elements.

TABLE 1 advantages of the method according to the present embodiments

| Metric | Present embodiment | Prior art |
| --- | --- | --- |
| Production time (h) | | |
| Further coated wire | Lower | Higher |
| Wire elements | Lower | Higher |
| Number of defects | | |
| First coated wire | Equal | Equal |
| Further coated wire | Lower | Higher |
| Wire elements | Lower | Higher |
| Production yield | Higher | Lower |
| Layer thickness variation | Lower | Higher |
| Further coated wire | Lower | Higher |
| Wire elements | Lower | Higher |
| Diameter variation | | |
| First coated wire | Equal | Equal |
| Further coated wire | Lower | Higher |
| Wire elements | Lower | Higher |

TABLE 1-continued advantages of the method according to the present embodiments

| Metric | Present embodiment | Prior art |
|---|---|---|
| Energy consumption | | |
| Further coated wire | Lower | Higher |
| Wire elements | Lower | Higher |
| Costs (€) | | |
| Further coated wire | Lower | Higher |
| Wire elements | Lower | Higher |
| Set-up time (d:h) | Lower | Higher |
| Measurement reliability | Higher | Lower |
| Life expectancy | Higher | Lower |

Although specific embodiments have been illustrated and described herein, it will be appreciated by those of ordinary skill in the art that a variety of alternate and/or equivalent implementations may be substituted for the specific embodiments shown and described without departing from the scope of the present embodiment. This application is intended to cover any adaptations or variations of the specific embodiments discussed herein. Therefore, it is intended that this embodiment be limited only by the claims and the equivalents thereof.

The invention claimed is:

1. A method for producing a plurality of wire elements, comprising:
   a. providing a metal wire, wherein the metal wire comprises an inner metal core layer;
   b. coating the metal wire with a first layer to obtain a first coated wire, wherein the first layer has a first thickness;
   c. subjecting the first coated wire to a first quality control process;
   d. marking any first defects identified in the first quality control process;
   e. coating the first coated wire with a further layer to obtain a further coated wire, wherein the further layer has a further thickness;
   f. introducing two or more repeating units along the further coated wire by reducing the first thickness, the further thickness, or both;
   g. cutting the further coated wire between at least one pair of neighbouring repeating units to obtain the plurality of wire elements;
   wherein prior to cutting the further coated wire in g to obtain the plurality of wire elements, a first length of the first coated wire is less than 10% longer than a further length of the further coated wire.

2. The method according to claim 1, wherein, before the two or more repeating units are introduced, the following are performed:
   a. subjecting the further coated wire to a further quality control process;
   b. identifying further defects;
   c. marking the further defects.

3. The method according to claim 2, wherein the further quality control process comprises at least one or all of the following:
   a. inspecting the further coated wire;
   b. testing at least one dimensional property of the further coated wire.

4. The method according to claim 1, wherein, after the two or more repeating units have been introduced, the following are performed:
   a. subjecting the repeating units to an additional quality control process;
   b. identifying additional defects;
   c. marking the repeating units that comprise at least one additional defect with a reject mark.

5. The method according to claim 4, wherein the additional quality control process comprises at least one or all of the following:
   a. inspecting at least one repeating units;
   b. testing the number of subsections in at least one repeating units;
   c. testing at least one dimensional property of at least one repeating units.

6. The method according to claim 1, wherein, prior to coating the metal wire with the first layer, the following are preformed:
   a. subjecting the metal wire to an another quality control process;
   b. identifying another defects;
   c. marking the another defects.

7. The method according to claim 6, wherein the another quality control process comprises at least one or all of the following:
   a. inspecting the metal wire;
   b. testing at least one physical property of the metal wire,
   c. testing at least one dimensional property of the metal wire.

8. The method according to claim 1, wherein laser ablation is used for at least one or all of the following:
   a. marking the first defects, the further defects, or both;
   b. reducing the first thickness, the further thickness, or both;
   c. applying the reject mark.

9. The method according to claim 1, wherein the repeating units has a length in the range of 1 mm to 110 mm.

10. The method according to claim 1, wherein the first quality control process comprises at least one or all of the following:
    a. inspecting the first coated wire;
    b. testing at least one physical property of the first coated wire;
    c. testing at least one dimensional property of the first coated wire.

11. The method according to claim 1, wherein the first length of the first coated wire is in the range of 1000 m to 6000 m.

12. The method according to claim 1, wherein the time required for performing steps b. through f. in claim 1 is in the range of 1 m/min to 900 m/min.

13. The method according to claim 1, wherein at least one or all of the following is true:
    a. at least 80% of an another length of the metal wire is coated with the first layer;
    b. at least 80% of the first length of the first coated wire is coated with the further layer.

* * * * *